United States Patent
Merrien et al.

(10) Patent No.: US 9,402,180 B2
(45) Date of Patent: Jul. 26, 2016

(54) METHOD FOR INITIATING AN OTA SESSION

(71) Applicant: GEMALTO SA, Meudon (FR)

(72) Inventors: Lionel Merrien, La Ciotat (FR); Patrice Amiel, La Ciotat (FR); Eric Preulier, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/369,373

(22) PCT Filed: Dec. 26, 2012

(86) PCT No.: PCT/EP2012/076915
§ 371 (c)(1),
(2) Date: Jun. 27, 2014

(87) PCT Pub. No.: WO2013/098298
PCT Pub. Date: Jul. 4, 2013

(65) Prior Publication Data
US 2015/0223061 A1    Aug. 6, 2015

(30) Foreign Application Priority Data

Dec. 29, 2011    (EP) .................................... 11306811

(51) Int. Cl.
*H04W 12/06* (2009.01)
*H04L 29/06* (2006.01)
*H04W 4/00* (2009.01)

(52) U.S. Cl.
CPC ........... *H04W 12/06* (2013.01); *H04L 63/0838* (2013.01); *H04W 4/003* (2013.01)

(58) Field of Classification Search
CPC ... H04L 63/08; H04L 63/0838; H04W 12/06; H04W 12/08; H04W 12/12; H04W 8/26; H04W 88/02; H04W 8/06; H04W 4/003
USPC .................................. 455/410–411, 418–420
See application file for complete search history.

(56) References Cited

U.S. PATENT DOCUMENTS

| 8,589,689 | B2* | 11/2013 | Palanigounder | .... H04L 63/0884 |
| | | | | 713/150 |
| 8,780,797 | B2* | 7/2014 | Chen | ..................... H04W 48/16 |
| | | | | 370/252 |

(Continued)

FOREIGN PATENT DOCUMENTS

| EP | 2106191 B1 * | 12/2012 | ............. H04L 63/12 |
| WO | WO 03/063411 A1 | 7/2003 | |
| WO | WO 2012177200 A1 * | 12/2012 | |

OTHER PUBLICATIONS

ETSI TS 122 038 V5.3.0 (Jun. 2003) Digital cellular telecommunications system (phase 2+); Universal Mobile Telecommunications System (UMTS); USIM/SIM Application Toolkit (USAT/SAT); Service description; stage 1.*

(Continued)

*Primary Examiner* — Sharad Rampuria
(74) *Attorney, Agent, or Firm* — Buchanan Ingersoll & Rooney PC

(57) ABSTRACT

The invention relates to a method for initiating an OTA session in a mobile radio communication network at the request of a user of a mobile terminal. The OTA session is established between the mobile terminal and a remote OTA server, the mobile terminal including a security element such as a UICC card. According to the invention, the method comprises: i) entering a special code using the man/machine interface of said mobile terminal; ii) said security element intercepting said special code; and iii) opening said OTA session between said mobile terminal and said remote server in a secure mode.

6 Claims, 1 Drawing Sheet

(56) References Cited

U.S. PATENT DOCUMENTS

| | | | | |
|---|---|---|---|---|
| 9,020,487 | B2* | 4/2015 | Brisebois | H04W 8/245 370/328 |
| 2009/0215385 | A1* | 8/2009 | Waters | H04L 63/0853 455/1 |
| 2012/0166654 | A1* | 6/2012 | Ali | G06F 17/2247 709/227 |
| 2012/0171992 | A1* | 7/2012 | Cheong | H04L 63/067 455/410 |
| 2013/0023235 | A1* | 1/2013 | Fan | H04W 48/18 455/411 |
| 2013/0203465 | A1* | 8/2013 | Ali | H04W 4/003 455/558 |

OTHER PUBLICATIONS

ETSI TS 122 038 V5.3.0 (Jun. 2003), Digital cellular telecommunications sytem (phase 2+); universal mobile telecommunication system (UMTS); USIM/SIM application toolkit (USAT/SAT); sevice description' stage 1.*

International Search Report (PCT/ISA/210) mailed on Feb. 11, 2013, by the European Patent Office as the International Searching Authority for International Application No. PCT/EP2012/076915.

"Digital Cellular Telecommunications System (Phase 2+); Universal Mobile Telecommunications System (UMTS); USIM/SIM Application Toolkit (USAT/SAT); Service Description; Stage 1 (3GPP TS 22.038 Version 5.3.0 Release 5)", ETSI TS 122 038. V5.3.0; IEEE, vol. 3-SA1, No. V5-.3.0, Jun. 1, 2003, pp. 1-22; XP-014007136.

* cited by examiner

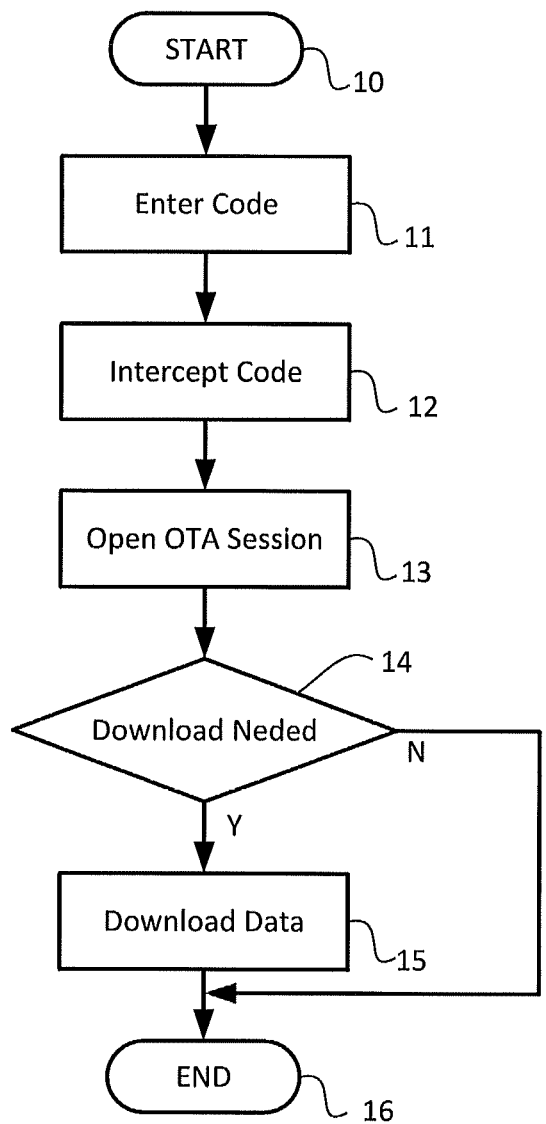

METHOD FOR INITIATING AN OTA SESSION

BACKGROUND OF THE INVENTION

The field of the invention is of telecommunications and in particular that of the initiation of OTA sessions in a network of the LTE (Long Term Evolution) type, also referred to as a fourth generation (4G) network.

LTE technology relies on an IP packet transport network. It has not provided a voice conveying mode, other than VoIP, unlike 3G, which transports voice in circuit mode (like conventional fixed telephony networks).

The purpose of an OTA session is to remotely administer a security element, such as a UICC card, inserted in a telecommunication terminal, for example a mobile telephone. The UICC card may also be in the form of an integrated circuit soldered directly in the mobile terminal and is in this case referred to as e-UICC.

An OTA session may operate in push mode or in pull mode.

In pull mode, the initiation of the OTA session is left to the initiative of the security element in the terminal. The security element determines the opportune moment for initiating an OTA session on the basis of technical events detectable by the security element, such as change of terminal (in the case of a UICC portable from one terminal to another), change of network, end of a timing, etc.

In push mode, it is the OTA platform that decides at what time it must send data to the security element. Push mode requires the presence of a push channel external to the OTA session itself, since the IP channel necessary for the OTA session can be opened only by the terminal (client) and not by the server. This push channel may for example be an SMS channel, or a USSD channel or an SIP channel.

Some OTA scenarios, such as for example change of telephone number, require an immediate update of the security element. In some cases, there is no push channel available (no SMS or no SIP), and there is also no technical event that would make it possible to initiate the OTA session.

The invention concerns the generation of a technical event directly by the user, for initiating the OTA session. The user therefore requests, on his own initiative, the updating of data and/or programs intended for his security element.

In a network of the LTE type, the downloading of data and/or programs in the security element is carried out using a secure protocol, for example of the https TYPE. This protocol is initiated by the user of the terminal, that is to say done by the security element. In the majority of cases, the security element uses a contextual event such as for example its insertion in a new terminal, the elapse of a period of time since the last OTA session, its geographical position (for example the crossing of a frontier) or any other event initiating an OTA session request.

In a network of the 3G type, when no contextual event is available and an OTA session is immediately necessary, the OTA server can send a message, for example an SMS, to the security element in order to request it to initiate an OTA session. This occurs for example when the user requests his operator to change his telephone number. However, this solution is not applicable if no means exist for sending an SMS from the OTA server to the security element. This case arises in particular in the case of networks of the LTE type, where it is not possible to send an SMS (all the transmissions pass through a network of the IP type).

Various solutions exist for solving this problem:
it is possible to detect the switching on of the terminal in order to open an https channel so as to contact the OTA platform to request a downloading of programs and/or data;
it is also possible for the user to consult a menu of the STK type, that is to say to seek, in the various applications on his terminal, the one enabling him to contact the OTA platform.

These solutions nevertheless require manipulations that are inconvenient for the user (switching his terminal off and switching it on again or navigating in the various menus on his terminal).

DETAILED DESCRIPTION OF THE INVENTION

The objective of the present invention is in particular to remedy these drawbacks.

To this end, the present invention proposes a method for initiating an OTA session in a mobile telecommunication network at the request of a user of a mobile terminal, the OTA session being established between the mobile terminal and a remote OTA server, the mobile terminal comprising a security element such as a UICC card.

This method consists of:
i—entering a specific code by means of the man-machine interface of the mobile terminal;
ii—intercepting the specific code by means of the security element;
iii—opening the OTA session between the mobile terminal and the remote server in secure mode.

In a preferential embodiment, the man-machine interface of the terminal is the keypad of the mobile terminal.

In another embodiment, the man-machine interface is a voice recognition device included in the mobile terminal.

Preferentially, the specific code is a unique password generated by a unique-password server, the unique password being transmitted to the mobile terminal so that its user has knowledge of it, the unique password transmitted to the terminal being compared with a unique password generated by the security element and, if the unique password received by the terminal and entered by the user is identical to the one generated by the security element, initiating steps ii and iii.

The invention finds a particular application in a network of the LTE type.

Other features and advantages of the invention will emerge from a reading of the following description of a preferential embodiment given by way of illustration and non-limitatively, and the accompanying single FIGURE showing this preferential embodiment.

The invention proposes to initiate an OTA session in a mobile radio-communication network at the request of a user of a mobile terminal (that is to say in pull mode). The OTA session must be established between the mobile terminal and a remote OTA server. The mobile terminal comprises a security element such as a UICC card that can be extracted from the terminal or an integrated circuit serving as a UICC card soldered in the mobile terminal (e-UICC).

In the accompanying single FIGURE, step 10 is a start step.

The invention consists of entering a specific code by means of a man-machine interface of the mobile terminal. This step, denoted 11, consists for example of entering a code such as *555 on the keypad of the terminal. This code was previously supplied to the user by his operator. The man-machine interface is typically the keypad of the mobile terminal. It may also be a voice command. The terminal then comprises a voice recognition device.

At step 12, the security element intercepts the specific code (for example *555) so that it is not entered. The control of calls by the security element is described in the ETSI standard TS 102.223. The security element, after having recognised this specific code, then opens an OTA session between the mobile terminal and the remote OTA server in secure mode, for example in https mode (step 13).

During a step 14, the OTA server checks whether data or programs must be downloaded into the security element. If such is the case, during a step 15, this downloading is effected. In the contrary case the process stops with an end step 16.

In a preferential embodiment of the invention, so that the users (subscribers to an operator) do not require their security elements to be updated too frequently, the specific code may be replaced by a unique password (OTP—One Time Password). This unique password is generated by a unique-password server. For a given terminal, the unique password is transmitted (via the operator) to the terminal so that its user has knowledge of it. The unique password transmitted to the terminal is compared with a unique password generated, in its case, by the security element and, if the unique password received by the terminal (and preferably stored in the security element) and entered by the user is identical to the one generated by the security element, the method resumes at step 12.

This unique password may be generated by a key included in the security element and a counter shared between the OTA server and the UICC. If the two coincide, the user is entitled to request an update of his security element by OTA.

The invention claimed is:

1. A method for initiating an OTA session in a mobile radio-communication network at the request of a user of a mobile terminal, said OTA session being established between said mobile terminal and a remote OTA server, said mobile terminal comprising a security element, wherein the method comprises:
   i—receiving a specific code manually entered at the initiative of the user via a man-machine interface of the mobile terminal;
   ii—intercepting said specific code, from the mobile terminal, by the security element, wherein the intercepting of the specific code is an initial interaction between the security element and the user of the mobile terminal for establishing the OTA session;
   iii—contacting the remote server when the security element recognizes the specific code; and
   iv—opening said OTA session between the mobile terminal and the remote server in secure mode.

2. The method according to claim 1, wherein said man-machine interface of said terminal is a keypad of said mobile terminal.

3. The method according to claim 1, wherein said man-machine interface of said terminal is a voice recognition device included in said mobile terminal.

4. The method according to claim 1, wherein said specific code is a unique password generated by a unique-password server, the unique password being transmitted to the mobile terminal so that its user has knowledge of it, the unique password transmitted to the terminal being compared with a unique password generated by the security element and, if the unique password received by the terminal and entered by the user is identical to the one generated by the security element, initiating steps ii and iii.

5. The method according to claim 1, wherein the method is implemented in a system of the LTE type.

6. The method according to claim 1, wherein the security element is a UICC card.

* * * * *